US010595265B2

(12) United States Patent
Suyama et al.

(10) Patent No.: US 10,595,265 B2
(45) Date of Patent: Mar. 17, 2020

(54) COMMUNICATION SYSTEM, CONTROL TERMINAL, AND METHOD FOR MANAGING COMMUNICATION SYSTEM

(71) Applicant: YAMAHA CORPORATION, Hamamatsu-shi (JP)

(72) Inventors: Akihiko Suyama, Hamamatsu (JP); Tomoyoshi Akutagawa, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/718,859

(22) Filed: Sep. 28, 2017

(65) Prior Publication Data
US 2018/0020395 A1 Jan. 18, 2018

Related U.S. Application Data

(63) Continuation of application No. PCT/JP2016/074187, filed on Aug. 19, 2016.

(30) Foreign Application Priority Data

Aug. 19, 2015 (JP) .............................. 2015-162327

(51) Int. Cl.
H04W 48/08 (2009.01)
G06F 13/00 (2006.01)
(Continued)

(52) U.S. Cl.
CPC .......... *H04W 48/08* (2013.01); *G06F 3/165* (2013.01); *G06F 3/167* (2013.01); *G06F 13/00* (2013.01);
(Continued)

(58) Field of Classification Search
CPC ..... H04W 48/08; H04W 48/12; H04W 84/12; G06F 3/165; G06F 3/167; G06F 13/00;
(Continued)

(56) References Cited

U.S. PATENT DOCUMENTS

2008/0232380 A1 9/2008 Nakayama
2011/0130144 A1* 6/2011 Schein .................... H04L 41/12
455/442

(Continued)

FOREIGN PATENT DOCUMENTS

JP 2003101546 A 4/2003
JP 2008072347 A 3/2008
(Continued)

OTHER PUBLICATIONS

International Search Report issued in Intl. Appln. No. PCT/JP2016/074187 dated Oct. 25, 2016. English translation provided.
(Continued)

*Primary Examiner* — Benjamin H Elliott, IV
(74) *Attorney, Agent, or Firm* — Rossi, Kimms & McDowell LLP

(57) ABSTRACT

A communication system includes one or more first communication devices mutually communicating via a network, and a first control terminal that controls the one or more first communication devices via the network. First system identification information indicating that the one or more first communication devices belong to a first communication system is attached to the one or more first communication devices. The one or more first communication devices and the first control terminal have a first system management table including the first system identification information and information on the one or more first communication devices. The first control terminal transmits a command via the network to the one or more first communication devices
(Continued)

to which the first system identification information is attached.

17 Claims, 8 Drawing Sheets

(51) Int. Cl.
    *H04L 29/06*     (2006.01)
    *H04R 5/04*     (2006.01)
    *G06F 3/16*     (2006.01)
    *G08C 17/02*     (2006.01)
    *H04W 48/12*     (2009.01)
    *H04W 84/12*     (2009.01)

(52) U.S. Cl.
    CPC .......... *G08C 17/02* (2013.01); *H04L 65/1073* (2013.01); *H04R 5/04* (2013.01); *H04R 2227/003* (2013.01); *H04R 2227/005* (2013.01); *H04R 2420/07* (2013.01); *H04W 48/12* (2013.01); *H04W 84/12* (2013.01)

(58) Field of Classification Search
    CPC ......... G06F 1/30; H04R 5/04; H04R 2420/07; H04R 2227/003; H04R 2227/005; G08C 17/02; H04L 65/1073
    See application file for complete search history.

(56) References Cited

U.S. PATENT DOCUMENTS

| | | | |
|---|---|---|---|
| 2013/0170363 A1* | 7/2013 | Millington | H04W 48/18 370/252 |
| 2014/0226834 A1* | 8/2014 | Kallai | H04R 27/00 381/80 |

FOREIGN PATENT DOCUMENTS

| | | |
|---|---|---|
| JP | 2011182329 A | 9/2011 |
| WO | 2014127282 A1 | 8/2014 |

OTHER PUBLICATIONS

Written Opinion issued in Intl. Appln. No. PCT/JP2016/074187 dated Oct. 25, 2016.

English translation of Written Opinion issued in Intl. Appln. No. PCT/JP2016/074187 dated Oct. 25, 2016, previously cited in IDS filed Sep. 28, 2017.

Office Action issued in Japanese Appln. No. 2015-162327 dated Jun. 12, 2019. English translation provided.

Office Action issued in Japanese Appln. No. 2015-162327 dated Sep. 3, 2019. English translation provided.

* cited by examiner

FIG. 3

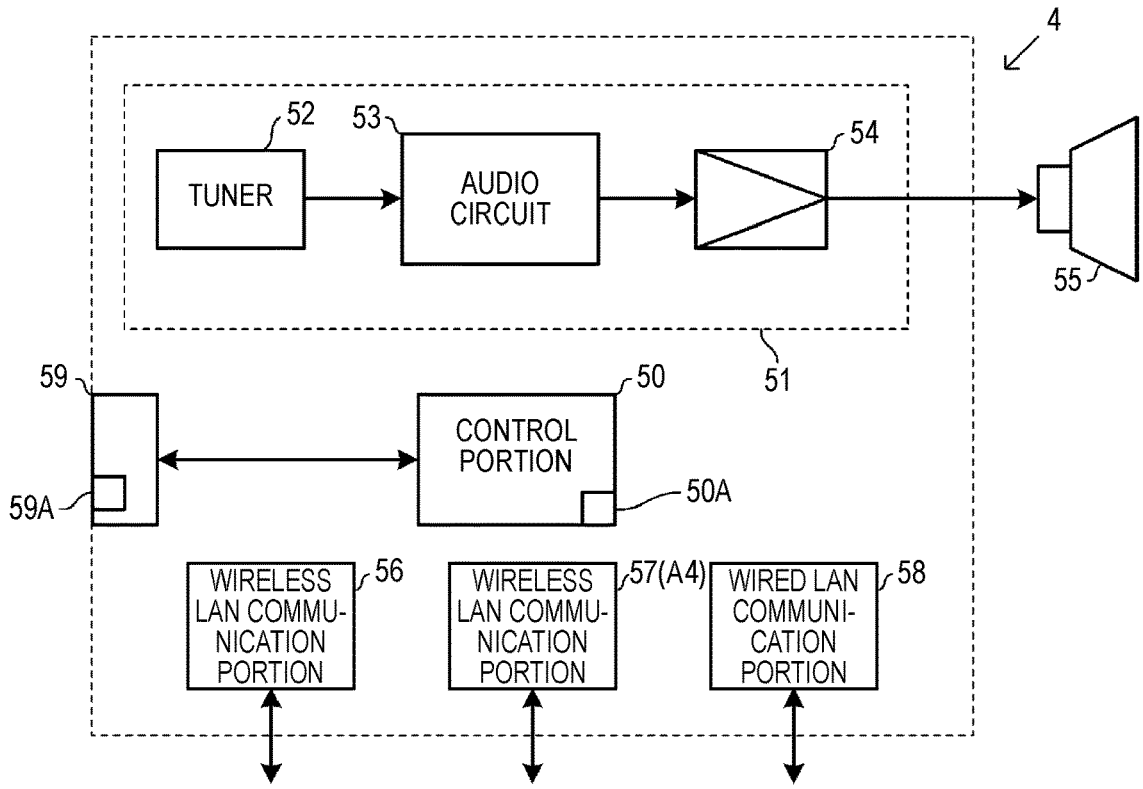

FIG. 4A

| SYSTEM ID | CONNECTION POSITION | MODEL | MAC ADDRESS 1, 2 | AP SSID |
|---|---|---|---|---|
| 01 | ROOT | AV RECEIVER | xx-xx-xx-xx-xx-xx<br>yy-yy-yy-yy-yy-yy | ****** |
| | NODE 1 | SPEAKER | xx-xx-xx-xx-xx-xx<br>yy-yy-yy-yy-yy-yy | ****** |
| | NODE 2 | SPEAKER | xx-xx-xx-xx-xx-xx<br>yy-yy-yy-yy-yy-yy | ****** |
| | BRANCH 1 | DISK PLAYER | xx-xx-xx-xx-xx-xx<br>yy-yy-yy-yy-yy-yy | ****** |
| | EXTERNAL ACCESS POINT INFORMATION | | | |

FIG. 4B

| SYSTEM ID | CONNECTION POSITION | MODEL | MAC ADDRESS 1, 2 | AP SSID |
|---|---|---|---|---|
| 03 | ROOT | AV RECEIVER | xx-xx-xx-xx-xx-xx<br>yy-yy-yy-yy-yy-yy | ****** |
| | NODE 1 | SPEAKER | xx-xx-xx-xx-xx-xx<br>yy-yy-yy-yy-yy-yy | ****** |
| | EXTERNAL ACCESS POINT INFORMATION | | | |

COMMUNICATION SYSTEM, CONTROL TERMINAL, AND METHOD FOR MANAGING COMMUNICATION SYSTEM

CROSS REFERENCE TO RELATED APPLICATIONS

This application is a continuation of PCT application No. PCT/JP2016/074187, which was filed on Aug. 19, 2016 based on Japanese Patent Application (Patent Application No. 2015-162327) filed on Aug. 19, 2015, the contents of which are incorporated herein by reference.

BACKGROUND OF THE INVENTION

1. Field of the Invention

This disclosure relates to a communication system having communication devices connected using a network, to a control terminal, and to a method for managing the communication system.

2. Description of the Related Art

In an audio system having a plurality of audio devices, the respective audio devices have conventionally been connected mutually with analog or digital audio cables. In recent years, for the purpose of eliminating entangled cable groups and raising the degree of freedom in the form of the connection, it is conceivable that the respective devices are connected via a network (a wireless network in particular) and that voice signals and command messages are transmitted and received by packets.

Although audio cables are required for all the input and output terminals of devices, the connection of the cables is completed by physically connecting the cables to the terminals of the devices. On the other hand, in a wireless network, as described in JP-A-2003-101546 for example, the setting of, for example, an SSID and a password is required, whereby this setting work is more complicated than the connection of the cables. Furthermore, in the case of the Ethernet (registered trademark: IEEE 802.3) network and the Wi-Fi (IEEE 802.11) network, since each of all the devices connected thereto can basically be seen from the other devices, it has been troublesome to construct a plurality of audio systems on the same network.

SUMMARY OF THE INVENTION

Accordingly, this disclosure is intended to provide a communication system wherein communication devices are connected using a network and a plurality of communication systems can be constructed on a single network, to provide a control terminal, and to provide a method for controlling the communication system.

(1) The communication system according to this disclosure is a communication system including:
one or more first communication devices mutually communicating via a network; and
a first control terminal that controls the one or more first communication devices via the network,
wherein first system identification information indicating that the one or more first communication devices belong to a first communication system is attached to the one or more first communication devices;
wherein the one or more first communication devices and the first control terminal have a first system management table including the first system identification information and information on the one or more first communication devices; and
wherein the first control terminal transmits a command via the network to the one or more first communication devices to which the first system identification information is attached.

(2) The control terminal according to this disclosure is a control terminal configured to be able to communicate with one or more communication devices mutually communicating via a first network, the control terminal including:
a communication circuit capable of being connected to the first network;
a storage configured to store a first system management table including a first system identification information indicating that the one or more first communication devices belong to a first communication system and the information on the one or more first communication devices; and
a control circuit configured to control the one or more communication devices,
wherein the control circuit is configured to transmit a command via the first network to the one or more communication devices to which the first system identification information is attached.

(3) The method for managing the communication system according to this disclosure is a method for managing a communication system including one or more first communication devices mutually communicating via a first network and a control terminal configured to control the one or more first communication devices via the first network,
wherein first system identification information indicating that the one or more first communication devices belong to a first communication system is attached to the one or more first communication devices;
wherein the control terminal has a first system management table including the first system identification information and the information on the one or more first communication devices; and
wherein the control terminal is configured to transmit a command via the first network to the one or more first communication devices to which the first system identification information is attached.

With the disclosure, a plurality of audio systems each having one or more audio devices can be constructed on a single network, and a single control terminal can control a plurality of audio systems.

BRIEF DESCRIPTION OF THE DRAWINGS

FIG. 3 is a block diagram showing an audio device to which this disclosure is applied;

FIGS. 4A and 4B are views showing examples of system management tables to be set in the controller and the audio devices;

DETAILED DESCRIPTION OF THE EXEMPLARY EMBODIMENTS

Figure 1:
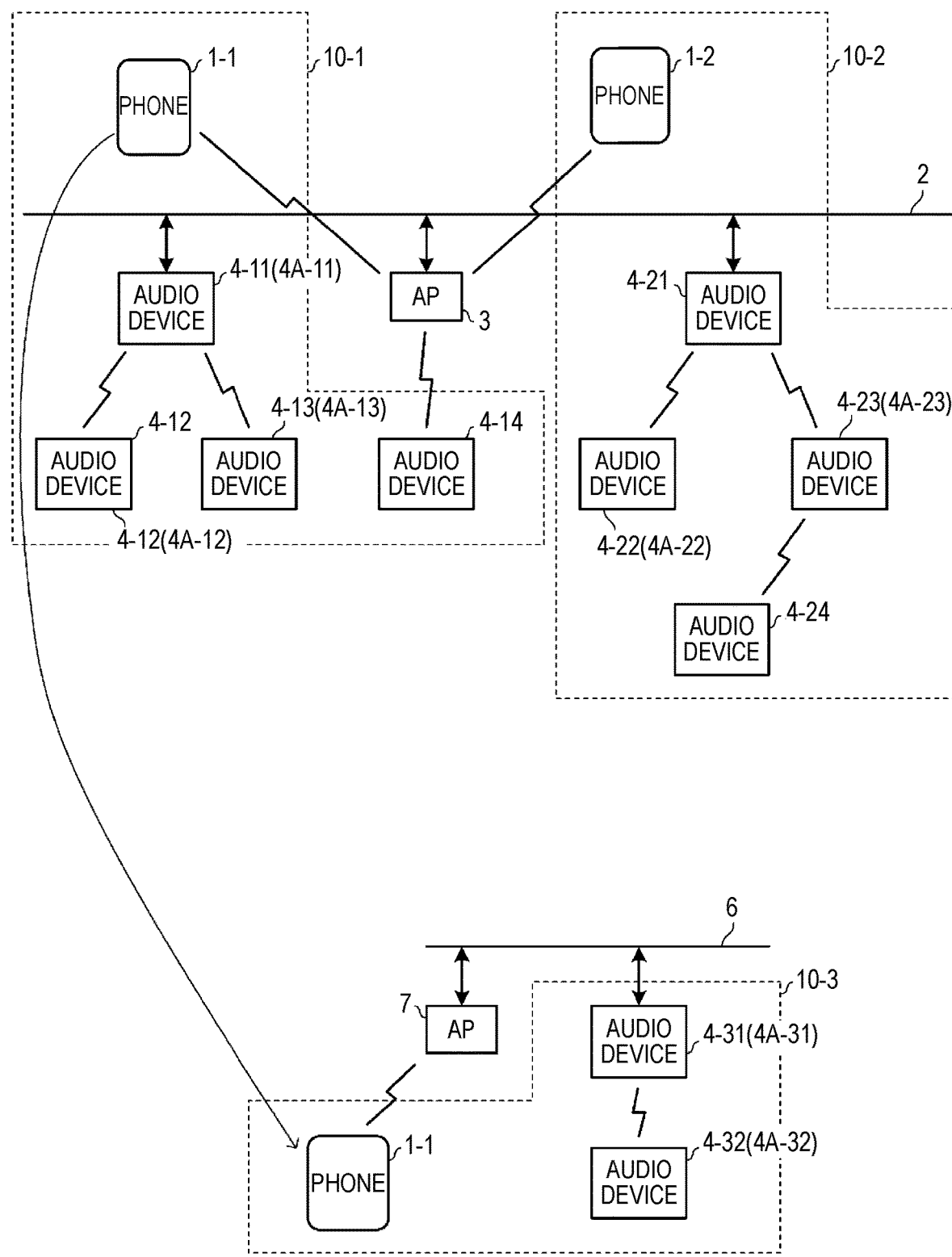
FIG. 1 is a view showing configurations of audio systems to which this disclosure is applied.

FIG. 1 is a view showing configurations of audio systems to which this disclosure is applied. In this view, three audio systems 10-1, 10-2 and 10-3 are described. Each audio system 10 has a plurality of audio devices 4 connected using networks including a wired LAN and a wireless LAN and has a multifunctional mobile phone 1 (hereafter referred to as a mobile phone) that functions as a controller 1. Each audio device and the controller 1 mutually transmit and receive audio signals and command messages via the networks. Each of the audio systems 10-1, 10-2 and 10-3 is identified by a unique system ID (hereafter referred to as LID in some cases). The system ID may merely be an arbitrary character string; in this embodiment, the system IDs of the audio systems 10-1, 10-2 and 10-3 are referred to as 01, 02 and 03. The system IDs correspond to the system identification information of this disclosure. Each audio device 4 constituting the audio system 10 has a wired LAN function and two wireless LAN functions.

The audio system 10-1 has a plurality of audio devices 4 (4-11 to 4-14) mutually connected using a wired LAN 2 and wireless LANs and has a multifunctional mobile phone 1-1 that functions as a controller 1-1. The audio system 10-2 has a plurality of audio devices 4 (4-21 to 4-24) mutually connected using the wired LAN 2 and wireless LANs and has a multifunctional mobile phone 1-2 that functions as a controller 1-2. These audio systems 10-1 and 10-2 share the wired LAN 2 and coexist in the same segment.

Furthermore, the audio system 103 has audio devices 4-31 and 4-32, and as the controller thereof, the controller 1-1 of the audio system 10-1 is used in common. In other words, when the user of the controller (mobile phone) 1-1 is at a place (for example, his/her home) in which the audio system 10-1 is installed, the mobile phone 1-1 functions as the controller 1-1 of the audio system 10-1, and when the user is at a place (for example, his/her office) in which the audio system 10-3 is installed, the mobile phone 1-1 functions as the controller of the audio system 10-3. The switching of the audio systems 10 to be controlled by the controller 1 will be described later.

As described above, each audio device 4 constituting the audio system 10 has a wired LAN function and two wireless LAN functions. The audio device 4 can activate an access point by using one of the two wireless LAN functions. The access point activated by the audio device 4 is referred to as an internal access point 4A. To the internal access point 4A, a lower-level audio device 4 is connected. The internal access point 4A operates in a stealth mode usually (except for initial connection time described later), whereby its existence is hardly known by other devices. The other wireless LAN function is a function operating as a wireless LAN slave device and is connected to the internal access point 4A of a higher-level audio device 4 or either one of external access points 3 and 7.

The access point (external access point, such as a router) 3 is connected to the wired LAN 2, and the access point (external access point) 7 is connected to a wired LAN 6. The audio devices 4-11 and 4-21 are connected to the wired LAN 2, and the audio device 4-31 is connected to the wired LAN 6. The audio devices 4-12 and 4-13, 4-22 and 4-23, and 4-32 are respectively connected to the internal access points 4A-11, 4A-21, and 4A-31 of the higher-level audio devices 4-11, 4-21, and 4-31 by the wireless LANs. The audio device 4-14 is connected to the external access point 3. Moreover, the controllers 1-1 and 1-2 communicate with the respective audio devices 4 via the external access point 3 or 7.

Ethernet (registered trade mark: IEEE 802.3), for example, is used for the wired LANs 2 and 6, and Wi-Fi (IEEE 802.11g), for example, is used for the wireless LANs.

The audio devices 4 are respectively referred to as a root device, a node device, a leaf device and a branch device depending on the form of the connection to the wired LANs 2 and 7. The root devices are the highest-level devices connected to the wired LANs 2 and 6 directly (with cables) (cable-connected to the routers); in FIG. 1, the audio devices 4-11, 4-21 and 4-31 are root devices. The root devices are audio devices that are first registered at the time when the respective audio systems 10-1, 10-2 and 10-3 are constructed, and are used as the base points of the respective audio systems 10-1, 10-2 and 10-3. The root device activates its internal access point 4A so that lower-level audio devices 4 are connected to the network and participate in the audio system 10.

The node device is a middle-level device connected to the root device (the internal access point 4A of the root device) via a wireless LAN; in FIG. 1, the audio devices 4-12, 4-13, 4-22, 4-23, and 4-32 are node devices. The node device activates its internal access point 4A so that lower-level audio devices 4 are connected to the network and participate in the audio system 10.

The leaf device is a lower-level device connected to the node device (the internal access point 4A of the node device) via a wireless LAN; in FIG. 1, the audio device 4-24 is a leaf device.

In this audio system, for high-quality audio signal transmission, up to two node devices are allowed to be connected to a root device. Furthermore, up to two leaf devices are allowed to be connected to each node device. Moreover, the hierarchy levels of the connection using the internal access point 4A are assumed to be up to three levels: root device, node device and leaf device. Hence, up to seven audio devices including the root device can be connected by the tree of the wireless LANs in which the root device is used as its apex. However, in this disclosure, the number of the hierarchy levels of the tree and the number of lower-level devices that can be connected to each audio device 4 are not limited to those specified in this embodiment.

A branch device, separated from the devices in the above-mentioned tree, is an audio device 4 that is connected to the external access point 3 or 7 via a wireless LAN and communicates with the other audio devices 4 inside the audio system 10 via the wired LAN 2 or 6; in FIG. 1, the audio device 4-14 is a branch device. In each audio system 10, the number of branch devices is not limited. The leaf device and the branch device do not activate their internal access points 4A.

Figure 2:
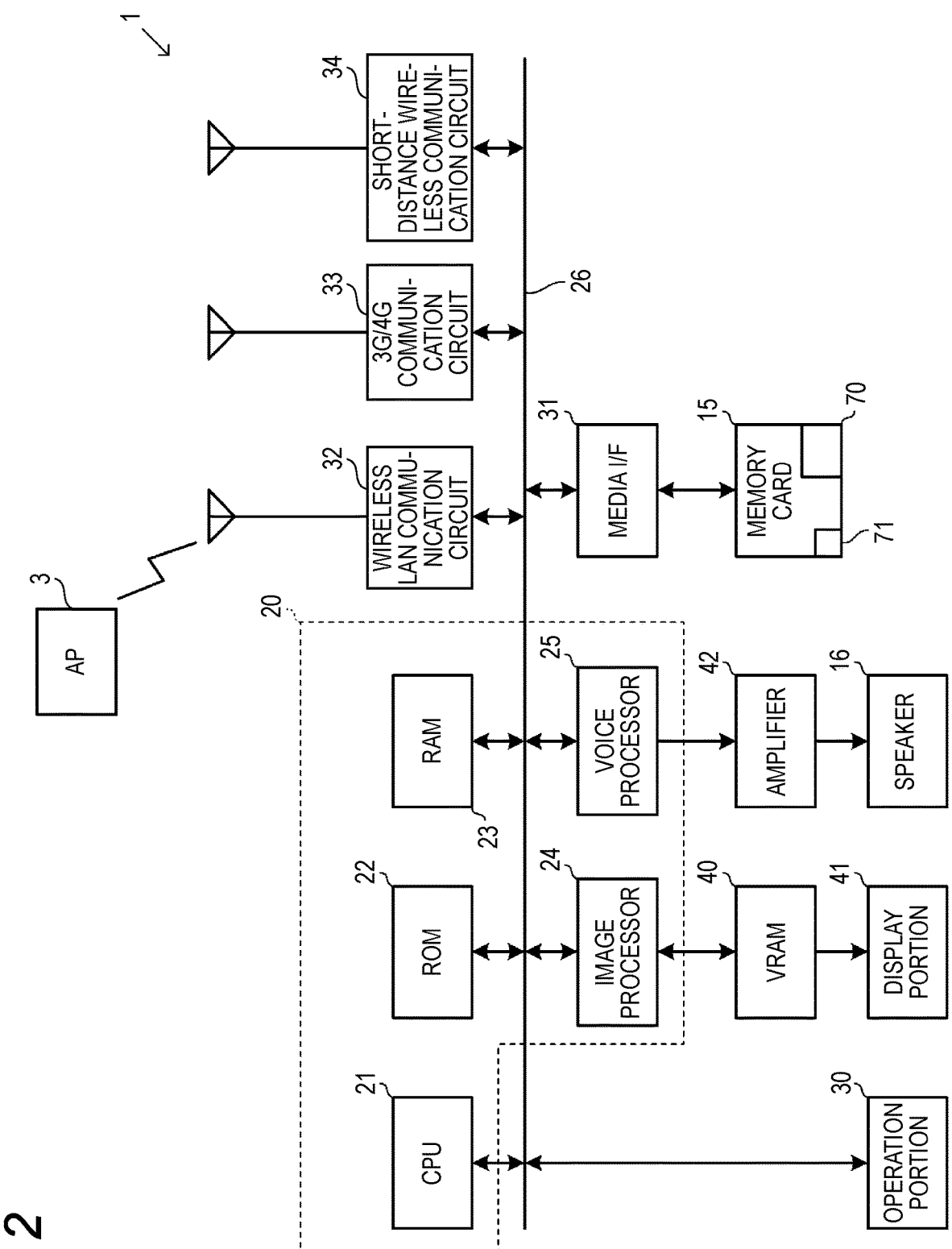
FIG. 2 is a block diagram showing a mobile phone which functions as a controller and to which this disclosure is applied.

The mobile phone 1 functions as an audio system controller (hereafter referred to as a controller) 1 by the activation of an audio system control program 70 (see FIG. 2). The mobile phone 1 (controller 1) is made to correspond to one audio system 10 and communicates with the audio devices 4 belonging to the audio system 10 via the network. By virtue of this communication, the controller 1 controls, for example, an audio source (for example, as to whether the music piece of which audio device 4 is distributed to which audio device 4) to be reproduced inside the audio system 10 and the volume thereof. Furthermore, each audio device 4 communicates with the audio devices 4 inside the audio system 10 to which the audio device itself belongs via the network, thereby mutually transmitting and receiving audio signals.

Next, the configuration of the mobile phone 1 will be described referring to the block diagram of FIG. 2. The mobile phone 1 is a multifunctional phone, a so-called smart phone. The mobile phone 1 has the 3G/4G communication function for mobile communication networks, the wireless LAN (Wi-Fi) communication function and the Bluetooth (registered trademark) communication function. By the activation of the audio system control program 70 being used as an application program, the mobile phone 1 functions as the controller 1, communicates with the audio devices 4 of the audio system via the network 3, and transmits the command message corresponding to the operation of the user to the audio devices 4, thereby controlling the audio system.

On a bus 26, the mobile phone 1 has a control portion 20, an operation portion 30, a media interface 31, a wireless LAN communication circuit 32, a 3G/4G communication circuit 33, and a short-distance wireless communication circuit 34 capable of carrying out the Bluetooth (registered trademark) communication. The control portion 20 includes a CPU 21, a ROM (flash memory) 22, a RAM 23, an image processor 24, and a voice processor 25. A video RAM (VRAM) 40 is connected to the image processor 24, and a display portion 41 is connected to the VRAM 40. The display portion 41 includes a liquid crystal display. Standby screens, telephone numbers, etc. are shown on the display. Furthermore, a screen for controlling the audio devices 4 is displayed in the case that the mobile phone functions as the controller 1. An amplifier 42 including a D/A converter is connected to the voice processor 25, and a speaker 16 is connected to the amplifier 42.

The image processor 24 is equipped with a GPU (graphics processing unit) for generating various images, such as standby screens, telephone numbers, etc. In the case that the audio system control program 70 is activated, the image processor 24 generates an image of an audio controller according to the instruction of the CPU 21 and develops the image on the VRAM 40. The image developed on the VRAM 40 is displayed on the display portion 41.

The voice processor 25 has a DSP (digital signal processor) for encoding/decoding speech voice. The voice processor 25 outputs decoded/generated voice to the amplifier 42. The amplifier 42 amplifies this voice signal and outputs the signal to the speaker 16.

The wireless LAN communication circuit 32 carries out wireless communication with a router 2 according to a standard, such as IEEE 802.11g, and communicates with the audio devices 4 via the access points 3 and 7. The 3G/4G communication circuit 33 carries out voice speech communication and data communication via mobile phone communication networks. The short-distance wireless communication circuit 34 communicates with other devices conforming to the Bluetooth (registered trademark) and transmits and receives audio signals, for example.

The operation portion 30 includes a touch panel formed on the display portion 41 and detects a touch operation and a flick operation on the touch panel. When the audio system control program 70 is activated, a plurality of operation elements, such as a setup button and a scan button, is displayed on the display portion 41. The operation portion 30 detects the touch operation of the user and the coordinates thereof on the touch panel and judges whether which operation element is operated.

A memory card 15 is connected to the media interface 31. The memory card 15 is, for example, a micro SD card. The audio system control program 70 is stored in the memory card 15 or the ROM 22. In this embodiment, it is assumed that the audio system control program 70 is stored in the memory card 15 as shown in FIG. 2. However, the audio system control program 70 may be downloaded by the 3G/4G or wireless LAN data communication or may be stored in the ROM 22 or the memory card 15 in advance. Furthermore, a storage area 71 for storing the configuration of the audio system is set in the memory card 15.

In the ROM 22, basic programs for executing the speech and application programs of the mobile phone 1 are stored in the ROM 22. Furthermore, the ROM 22 is a flash memory and can store, for example, downloaded application programs in addition to the basic programs. In the RAM 23, a work area that is used when the CPU 20 executes the audio system control program 70 is set.

Next, the configuration of the audio device 4 will be described referring to FIG. 3. The audio device 4 has a control portion 50, an audio processing portion 51 and an operation portion 59, and also has two wireless LAN communication portions (RF modules) 56 and 57 and a wired LAN communication portion 58. The operation portion 59 has a connect button 59A. The control portion 50 has a CPU and a memory and stores an audio system program. The control portion 50 controls the operations of the audio processing portion 51, the wireless LAN communication portions 56 and 57 and the wired LAN communication portion 58 by using the audio system program. Furthermore, when the connect button 59A is pressed, the control portion 50 carries out an initial connection operation, i.e., an operation for connecting this audio device 4 to the network 3. The details of the initial connection operation will be described later.

The wireless LAN communication portion 56 carries out wireless communication with the access points 3 and 7 according to a wireless LAN standard, such as IEEE 802.11g. Furthermore, the other wireless LAN communication portion 57 is activated as an access point (internal access point 4A) and relays the other audio devices (for example, the audio devices 4-12 and 4-13) to the wired LAN 2. Moreover, the wireless LAN communication portion 57 is also activated as a temporary access point for initial connection at the initial connection time of this audio device 4 and communicates with the controller 1 (mobile phone 1). The operation at the initial connection time will be described later. The two wireless LAN communication portions 56 and 57 may be achieved by operating a single piece of hardware in time division. The wired LAN communication portion 58 has a cable connector and carries out communication via the wired LANs 2 and 6 and the access points 3 and 7 according to a communication standard, such as IEEE 802.3. The controller 1 wherein the mobile phone is used as hardware is connected to the access points 3 and 7, and the control portion 50 communicates with the controller 1 via the wired LAN or the wireless LAN to transmit operation states and to receive command messages.

The SSID and the password of the internal access point 4A are configured by character strings that can be derived from the MAC address of the wireless LAN communication portion 57. For example, the octet representation of the MAC address is used as the SSID, and the lower three octets (model ID+serial number) are used as the password. With this setting, an audio device newly participating in the audio system can find an internal access point 4A on the basis of the SSID, that is, on the basis of the vender ID and the model ID of the MAC address, and the audio device can generate a password by itself and can make connection to the internal access point 4A. Hence, in the case of the connection to the internal access point 4A, the input of the SSID and the password by the user can be omitted. However, the method for generating the SSID and the password of the internal access point 4A is not limited to the method described above.

The audio processing portion 51 has a tuner 52, an audio circuit 53 and a power amplifier 54. The tuner 52 receives an audio signal from an FM broadcast or the Internet and inputs the signal to the audio circuit 53. The audio circuit 53 carries out processes, such as equalizing and volume adjustment, for the input audio signal, and outputs the processed audio signal to the power amplifier 54. The power amplifier 54 amplifies the input audio signal and outputs the audio signal to a speaker 55 connected externally. The speaker 16 emits the input audio signal as sound.

Although the audio devices 4-11 to 4-32 may be different from one another, the basic configurations of the communication function and the audio signal processing function thereof are those shown in FIG. 3.

Each of FIGS. 4A and 4B is a view showing an example of a system management table. Each of the respective audio devices 4 and the controller 1 constituting the audio system 10 stores the system management table of the system thereof. In the system management table, for example, the system ID; the connection positions, the models, the upper and lower MAC addresses, the SSIDs of the internal access points of the audio devices 4 belonging to this audio system; and external access point information are written. The connection positions correspond to the connection forms for the above-mentioned wired LANs 2 and 6, and each position has a number assigned to the root, node (1, 2), leaf (11, 12, 21, 22) or branch. The upper and lower MAC addresses are the MAC addresses of the two wireless LAN communication portions 56 and 57 and serve as information for identifying the devices in the wireless LAN. The external access point information is information relating to the external access point to which the controller 1 or the branch device 4 is connected, and, for example, the SSID and the password of this external access point are written. However, the storage contents of the system management table are not limited to those shown in FIGS. 4A and 4B.

FIG. 4A is the system management table of the audio system 10-1. Since the audio system 10-1 has four audio devices 10-11 to 10-14, the device information on these four devices is written in the system management table. Furthermore, FIG. 4B is the system management table of the audio system 10-3. Since the audio system 10-3 has two audio devices 10-31 and 10-32, the device information on these two devices is written in the system management table.

Each of these system management tables is prepared by the controller 1 for controlling the audio system 10 corresponding thereto and distributed to the respective audio devices 4. Hence, the control portions 50 of the respective audio devices 4-11 to 4-14 of the audio system 10-1 store the system management table of FIG. 4A, and the control portions 50 of the respective audio devices 4-31 and 4-32 of the audio system 10-3 store the system management table of FIG. 4B. Furthermore, the control portions 50 of the audio devices 4-21 to 4-24 of the audio system 10-2 store a system management table prepared separately, not shown.

Since the controller 1-1 controls both the audio system 10-1 and the audio system 10-3 by movement (switching) as shown in FIG. 1, the controller stores both the system management tables of FIGS. 4A and 4B.

The controller 1 constructs an audio system 10 (for example, system ID=01) by registering a first audio device 4 as a root device, and then a second and subsequent audio devices 4 can be added to this audio system 10. Furthermore, by switching the system management table of the system to be controlled, the controller 1 can switch the audio system 10 to be controlled and can control a different audio system 10. For example, when the controller 1-1 is connected to the access point 3, the controller refers to the system management table of FIG. 4A and controls the audio system 10-1 (system ID=01); when the controller 1-1 is connected to the access point 7, the controller refers to the system management table of FIG. 4B and controls the audio system 10-3 (system ID=03).

Figure 5:
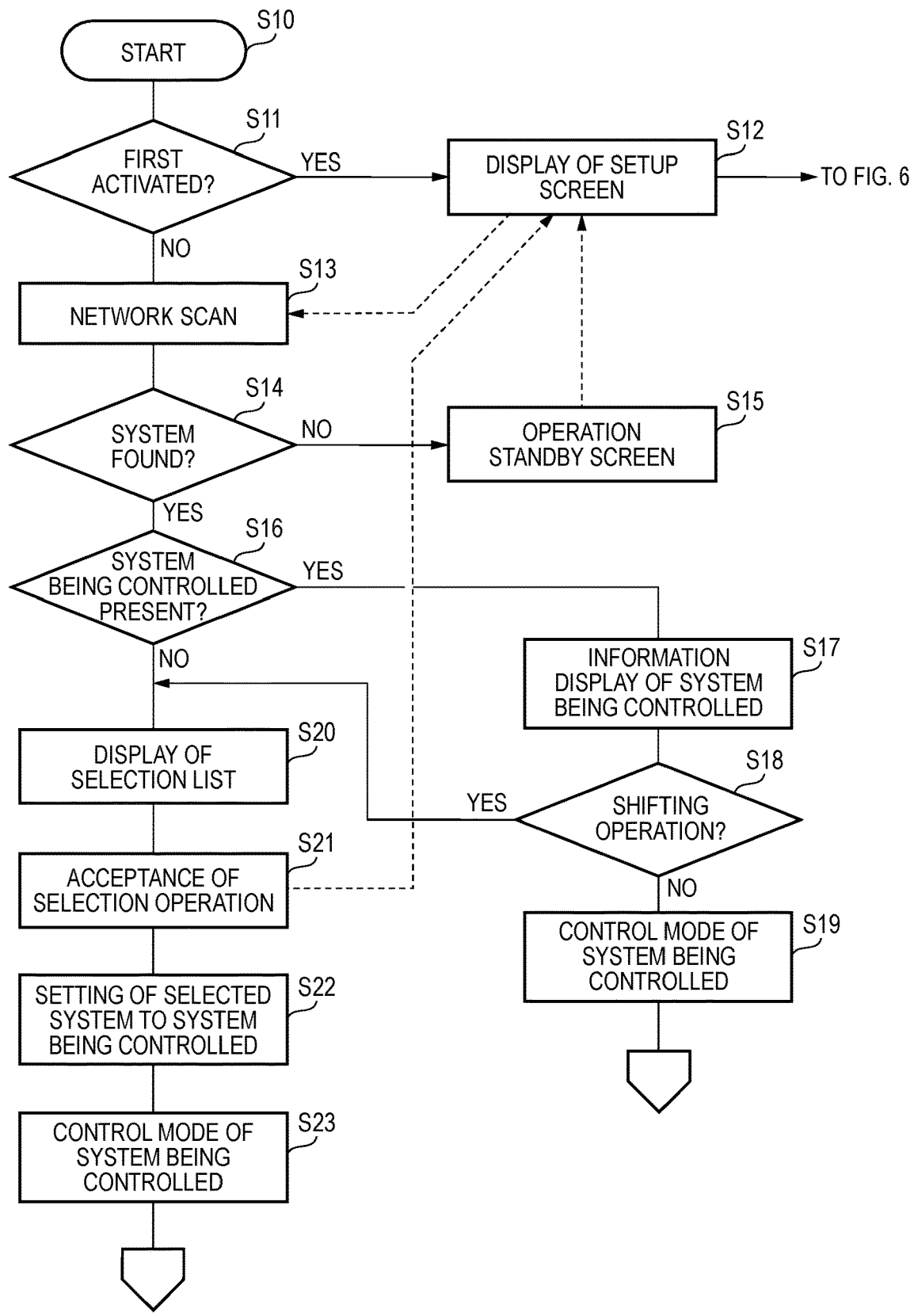
FIG. 5 is a flow chart showing the operation at the activation time of the controller.

The operation at the activation time of the controller 1 will be described referring to the flow chart of FIG. 5. When the audio system control program 70 is activated and the mobile phone 1 is activated as the controller 1 (at step S10; step Sn is hereafter written as Sn), the controller judges whether the audio system control program 70 (control app) 70 is installed in the mobile phone 1 and first activated (at S11). In the case that the program is first activated (YES at S11), a screen for urging the user to newly set up an audio system 10 is displayed (at S12), and the processing advances to the process for constructing a new audio system 10. The process for constructing the new audio system will be described in FIG. 6. Even in the case that the program is first activated and the processing has advanced to S12, the processing can advance to the process for searching for an existing system at S13 by the operation of the user.

In the case that the program is not first activated (NO at S11), network scan is carried out via the access point, and search is carried out to judge whether audio systems 10 are present on the network (at S13). Since the root device in an existing audio system 10 periodically transmits a beacon including a system ID, the controller 1 can detect the presence of the existing audio system 10 by receiving this beacon. In the case that no audio system 10 is found (NO at S14), there is no audio system to be controlled; hence, an operation standby screen is displayed and the processing stands by (at S15). At this time, in the case that a setup operation is carried out without ending the audio system control program 70, the processing is shifted to S12.

In the case that audio systems 10 are found at S14 (YES at S14), a judgment is made as to whether an audio system 10 being controlled and having been connected by this controller 1 until the last time of the end of the program is present among them (at S16). The judgment as to whether an audio system is a system being controlled can be made by the collation of the system ID thereof. (It is assumed that the system ID of the system to be controlled immediately before has been stored in the controller 1.) In the case that a system being controlled is present (YES at S16), the system information of the system being controlled is read from the system management table and displayed on the screen (at S17). At this time, if the operation for shifting the system to be controlled to another audio system 10 is not carried out (YES at S18), the processing advances to the control mode of this system being controlled (at S19).

In the case that a system being controlled cannot be found on the network at S16 (NO at S16) or in the case that, although a system being controlled is found, the shifting of the system to be controlled is selected by the operation of the user (YES at S18), the processing advances to S20. At S20, the selection list of the found audio systems 10 is displayed on the display portion 41. At this time, the audio systems 10 having been controlled in the past may merely be placed at high positions in the list. After that, the selection of the audio system 10 to be controlled from this list is accepted (at S21).

At this time, in the case that the construction of a new audio system 10 is selected without shifting to the control of an existing audio system 10, the processing is shifted to S12. In the case that any one of audio systems 10 is selected as the system to be controlled at S21, the selected audio system 10 is set as the system being controlled (at S22), and the processing advances to the control mode of this system being controlled (at S23).

"The case that a system being controlled cannot be found on the network (NO at S16)" described above is, for example, a case in which the user of the mobile phone 1-1 has moved from his/her home where the audio system 10-1 is present to his/her office where the audio system 10-3 is present. Furthermore, "the case that, although a system being controlled is found, the shifting of the system to be controlled is selected by the operation of the user (YES at S18)" is, for example, a case in which the user having been controlling the audio system 10-1 with the mobile phone 1 attempts to control the audio system 10-2 that is seen on the same network.

Furthermore, even in the control modes (at S19, S23) of the system being controlled, rescanning can be carried out at any time, and the audio system 10 to be controlled can be switched. Even in the audio system 10 not having been controlled even once, a system management table can be obtained from the root device of the audio system 10.

By the above-mentioned operation, the controller 1 can carry out the setup of a new audio system 10 at the time of initial activation, and at the time of the second and subsequent activations, the processing can automatically advance to the control of the system being controlled that has been controlled at the last time of the end of the program. Furthermore, even after the second and subsequent activations, the construction of a new system or the shifting to an audio system 10 other than the system being controlled at present can be carried out by pressing the setup button or the scan button.

In the control mode of the system being controlled, the controller 1 herein carries out the operation described below. The respective audio devices 4 belonging to the audio system 10 (for example, system ID=01) being controlled and the installation places thereof (a bedroom, a dining room and the like) are displayed, and the selection of an audio device 4 is accepted. The selection of an audio source or a music piece capable of being reproduced by the selected audio device 4 is accepted. A command message is transmitted to the selected audio device 4 so that the reproduction of the designated audio source or music piece is started. This command message is transmitted by unicast to the selected audio device 4. The selected audio device 4 reproduces the designated audio source or music piece and emits sound from its own speaker and also transmits this audio signal to the other audio devices 4 belonging to the audio system 10. This transmission is carried out by multicast to the above-mentioned audio devices 4 belonging to the system. Moreover, the controller 1 displays a volume control screen for controlling the volume of the musical sound to be reproduced (emitted), and accepts the volume control by the user. When the operation of the volume adjustment by the user is carried out, the volume control command message based on the content of the operation is transmitted to the respective audio devices 4. This command message may be transmitted by multicast to the audio devices 4 belonging to the system or separate command messages matching to the control scales of the respective audio devices 4 may be edited and respectively transmitted by unicast.

Next, the procedure for registering the audio devices 4 in the audio system 10 will be described referring to FIGS. 6 to 9.

The audio system 10 is constructed such that the audio device 4 connected to the wired LAN 2 with a cable communicates with the controller 1 and is set as a root device. After that, for example, node devices to be connected to this root device and leaf devices to be connected to the node devices are added. Furthermore, after the installation of the root device, that is, after the audio system 10 is constructed, branch devices can be installed arbitrarily. The construction of the audio system 10 and the registration of an audio device 4 in the audio system 10 are carried out such that the audio device 4 communicates with the controller 1 for controlling the audio system 10 (having the system ID corresponding thereto), and the controller 1 registers the audio device 4 in the system management table of the audio system 10.

Figure 6:
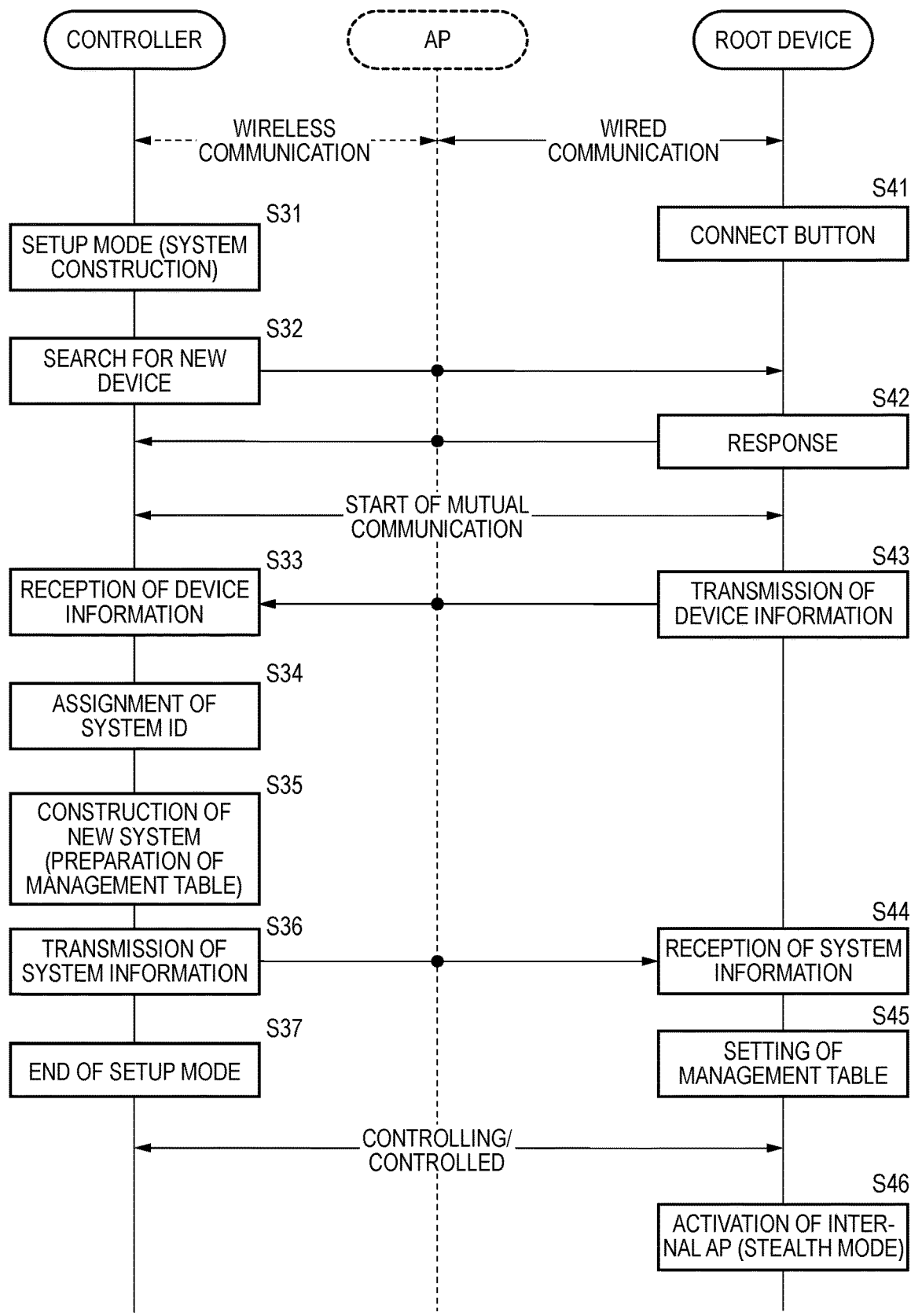
FIG. 6 is a view showing a procedure for communication between the controller and an audio device.

FIG. 6 is a view showing the communication procedure between the controller 1 and the audio device 4 serving as the root device in the case that the audio system 10 is newly constructed. The audio system control program 70 has been activated and the mobile phone 1 functions as the controller 1. When the controller 1 enters a setup mode by user operation (at S31), a guidance screen for urging the user to press the connect button 59A of the audio device 4 is displayed on the display portion 41. The user presses the connect button 59A of the audio device 4 according to the guidance on this screen (at S41). Next, the controller 1 searches for a new audio device 4 connected to the wired LAN 2 (or 6) (at S32). This search is carried out by transmitting a message requesting a reply, such as polling. The audio device 4 responds to this search (at S42). Hence, the controller 1 and the audio device 4 mutually communicate via the wired LAN 2 and the access point 3.

The audio device 4-12 transmits its own device information to the controller 1-1 (at S76). The controller 1-1 additionally registers this audio device 4-12 in the audio system 10-1 (LID 10) being managed at present and updates the system information (at S55). The audio device 4 transmits its own device information to the controller 1 (at S43). The controller 1 newly constructs an audio system 10 by using this audio device 4 as the root device. A system ID (for example, "01") is assigned to the audio system 10 (at S34), the system management tables shown in FIGS. 4A and 4B are prepared, and the audio system in which the audio device 4 carrying out communication at present is used as the root device is constructed (at S35). The system information serving as the contents of the system management tables is transmitted to the audio device 4 serving as the root device (at S36), and the setup mode is ended (at S37). The audio device 4 receives this system information (at S44) and prepares its own system management table (at S45). Hence, the audio device 4 (root device) becomes a component of the audio system 10, and, for example, a music piece to be reproduced and its volume are controlled by the controller 1 for controlling this audio system. Although the audio device 4 is activated as an access point, the audio device is usually set to a stealth mode, that is, a state in which its SSID cannot be confirmed from the outside (at S46).

Figure 7:
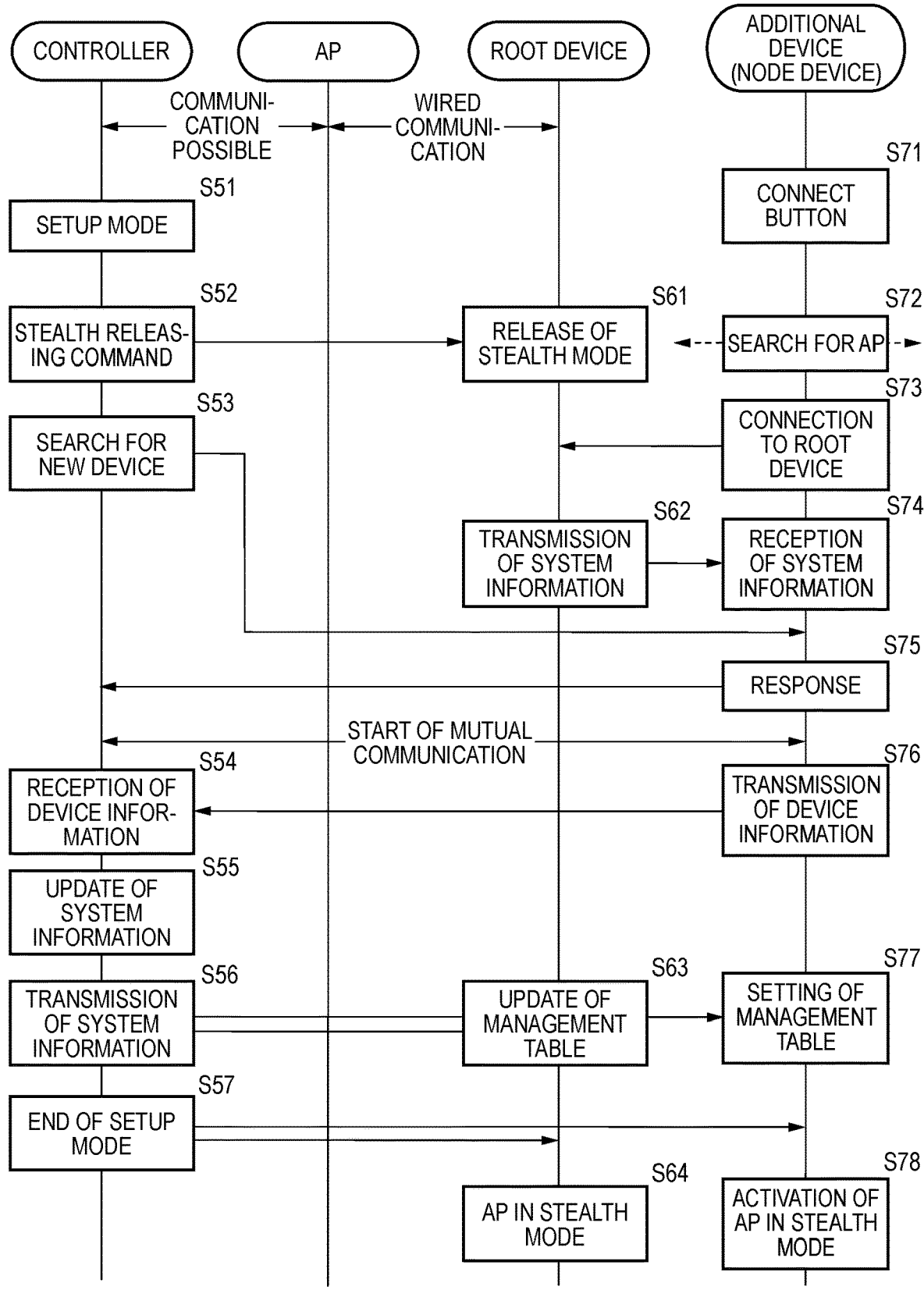
FIG. 7 is a view showing a procedure for communication between the controller and audio devices.

FIG. 7 is a view showing the communication procedure in the case that a node device is added to a constructed audio system. In this example, a case in which a node device (audio device 4-12) is connected to the root device (audio device 4-11) of the audio system 10-1 will be described.

When the mobile phone 1-1 functioning as the controller 1-1 enters a setup mode by user operation (at S51), a guidance screen for urging the user to press the connect button 59A of the audio device 4 is displayed on the display portion 41. The user presses the connect button 59A of the audio device 4-12 according to the guidance on this screen (at S71). The controller instructs the audio device 4-11 (root device) having already been registered in the system management table to release the stealth mode (at S52). Hence, the audio device 4-11 releases the stealth mode of the internal access point 4A-11 and transmits a beacon notifying its existence, whereby the access point is made accessible from the audio device 4-12 (at S61). The beacon transmitted by the internal access point 4A is the so-called Wi-Fi beacon packet including information, such as SSID, channel information and transfer speed. Next, the controller 1-1 starts the search for a new device (at S53).

When the connect button 59A is pressed by the user (at S71), the audio device 4-12 enters an initial connection mode and searches for a connectable access point (at S72). The audio device 4-12 finds the internal access point 4A-11 as a connectable access point by this search. As described above, the internal access point 4A-11 has an SSID according to which the internal access point 4A-11 can be identified as a device belonging to the audio system 10 as viewed from the audio device 4-12, and a password is generated from the SSID (or MAC address), whereby connection is made possible. The audio device 4-12 makes connection to the internal access point 4A-11 (root device 4-11) by using the SSID and the generated password (at S73). After that, the system information of the audio system 10-1 (system ID=01) at the present time (before the audio device 4-12 is registered) is obtained from the root device 4-11 (at S62, S74). Hence, the audio device 4-12 can communicate with the audio device 4 (only the audio device 4-11 at the present state) of the audio system 10-1. However, the audio device has not yet been registered in the controller 1-1.

The audio device 4-12 receives a search message (the search is carried out at S53) from the controller 1-1 via the access point 3, the wired LAN 2 and the root device 4-11, and responds to this message (at S75). Hence, the controller 1-1 and the audio device 4-12 start mutual communication via the root device 4-11, the wired LAN 2 and the access point 3.

The audio device 4-12 transmits its own device information to the controller 1-1 (at S76). The controller 1-1 additionally registers this audio device 4-12 in the system management table of the audio system 10-1 (system ID=01) that is being managed at present, thereby updating the system information (at S55). The updated system information is transmitted to all the audio devices 4 of the audio system 10-1 (at S56), and the setup mode is ended (at S57). The notification of the end of the setup mode is also transmitted to all the audio devices 4.

The audio devices 4-12 receives this system information and sets the management table of the audio system 10-1 to which the audio device itself belongs (at S77). Hence, the audio device 4-12 becomes a component of the audio system 10-1, and, for example, a music piece to be reproduced and its volume are controlled by the controller 1-1. Then, the audio device 4-12 activates an internal access point 4A-12 in the stealth mode (at S78). Furthermore, the root device 4-11 having received the system information from the controller 1-1 updates the management table stored therein by using this system information (at S63). Then, the mode of the internal access point 4A-11 is returned to the stealth mode (at S64). A new device can thus be added to the constructed audio system 10 by carrying out the above-mentioned processes.

Figure 8:
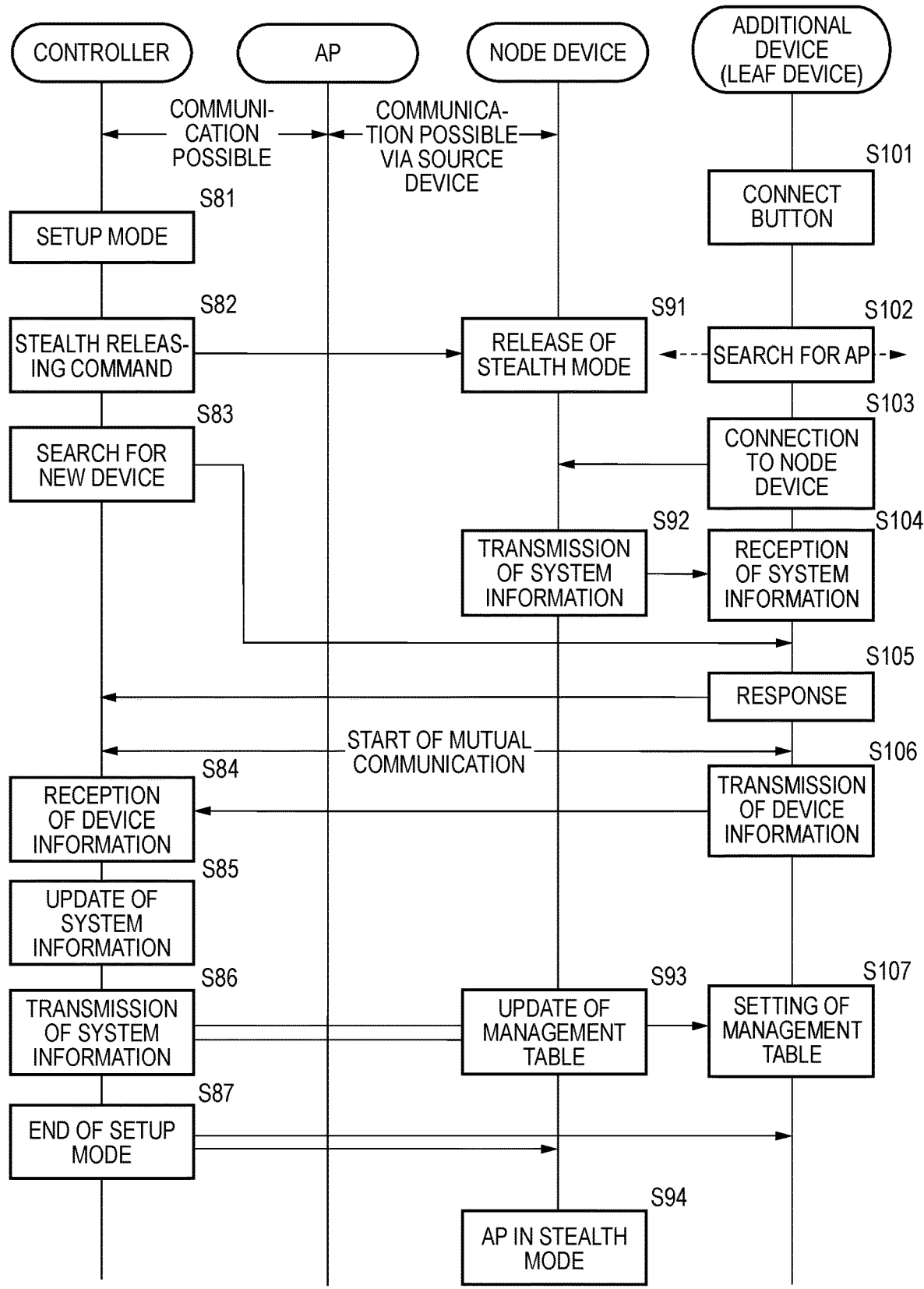
FIG. 8 is a view showing a procedure for communication between the controller and audio devices.

FIG. 8 is a view showing the communication procedure in the case that a leaf device is further added to the constructed audio system 10. In this example, a case in which the leaf device 4-24 is connected to the node device 4-23 of the audio system 10-2 will be described. The procedure in the case that a leaf device is connected to a node device is almost similar to the procedure in the case that a node device is connected to a root device.

When the mobile phone 1-2 functioning as the controller 1-2 enters a setup mode by user operation (at S81), a guidance screen for urging the user to press the connect button 59A of the audio device 4 is displayed on the display portion 41. The user presses the connect button 59A of the audio device 4-24 according to the guidance of this screen (at S101). The controller 1-2 instructs the audio devices 4 (the root device 4-21, the node devices 4-22 and 4-23) having already been registered in the system management table to release the stealth mode (at S82). Hence, each audio device 4 releases the stealth mode of the access point and transmits a beacon notifying its existence, whereby the access point is made accessible from the audio device 4-24 (at S91). Next, the controller 1-2 starts the search for a new device (at S83).

When the connect button 59A is pressed by the user (at S101), the audio device 4-24 enters an initial connection mode and searches for a connectable access point (at S102). It is herein assumed that the audio device 4-24 has found the internal access point 4A-23 of the node device 4-23. The audio device 4-24 makes connection to the internal access point 4A-23 (the node device 4-23) by using the SSID and the password derived from the MAC address of the internal access point 4A-23 (at S103). After that, the system information of the audio system 10-2 (system ID=02) at the present time (before the audio device 4-23 is registered) is obtained from the node device 4-23 (at S92, S104). Hence, the audio device 4-24 can communicate with the audio devices 4 of the audio system 10-2. However, the audio device has not yet been registered in the controller 1-2.

The audio device 4-24 receives the search message (the search is carried out at S83) from the controller 1-2 via the access point 3, the wired LAN 2, the root device 4-21 and the node device 4-23 and responds to this message (at S105). Hence, the controller 1-1 and the audio device 4-12 start mutual communication via the node device 4-23, the root device 4-21, the wired LAN 2 and the access point 3.

The audio device 4-24 transmits its own device information to the controller 1-2 (at S106). The controller 1-2 additionally registers the audio device 4-24 in the system management table of the audio system 10-2 having system ID 02 and being managed at present, thereby updating the system information (at S85). The updated system information is transmitted to all the audio devices 4 of the audio system 10-2 (at S86), and the setup mode is ended (at S87). The notification of the end of the setup mode is also transmitted to all the audio devices 4.

The audio device 4-24 receives this system information and sets the management table of the audio system 10-2 to which the audio device itself belongs (at S107). Hence, the audio device 4-24 becomes a component of the audio system 10-2, and, for example, a music piece to be reproduced and its volume are controlled by the controller 1-2. Furthermore, the node device 4-23 having received the system information from the controller 1-2 updates the management table stored therein by using this system information (at S93). Then, the mode of the internal access point 4A-23 is returned to the stealth mode (at S94). In parallel with these processes, processes similar to those at S93 and S94 are also carried out in the root device 4-21 and the node device 4-22.

Figure 9:
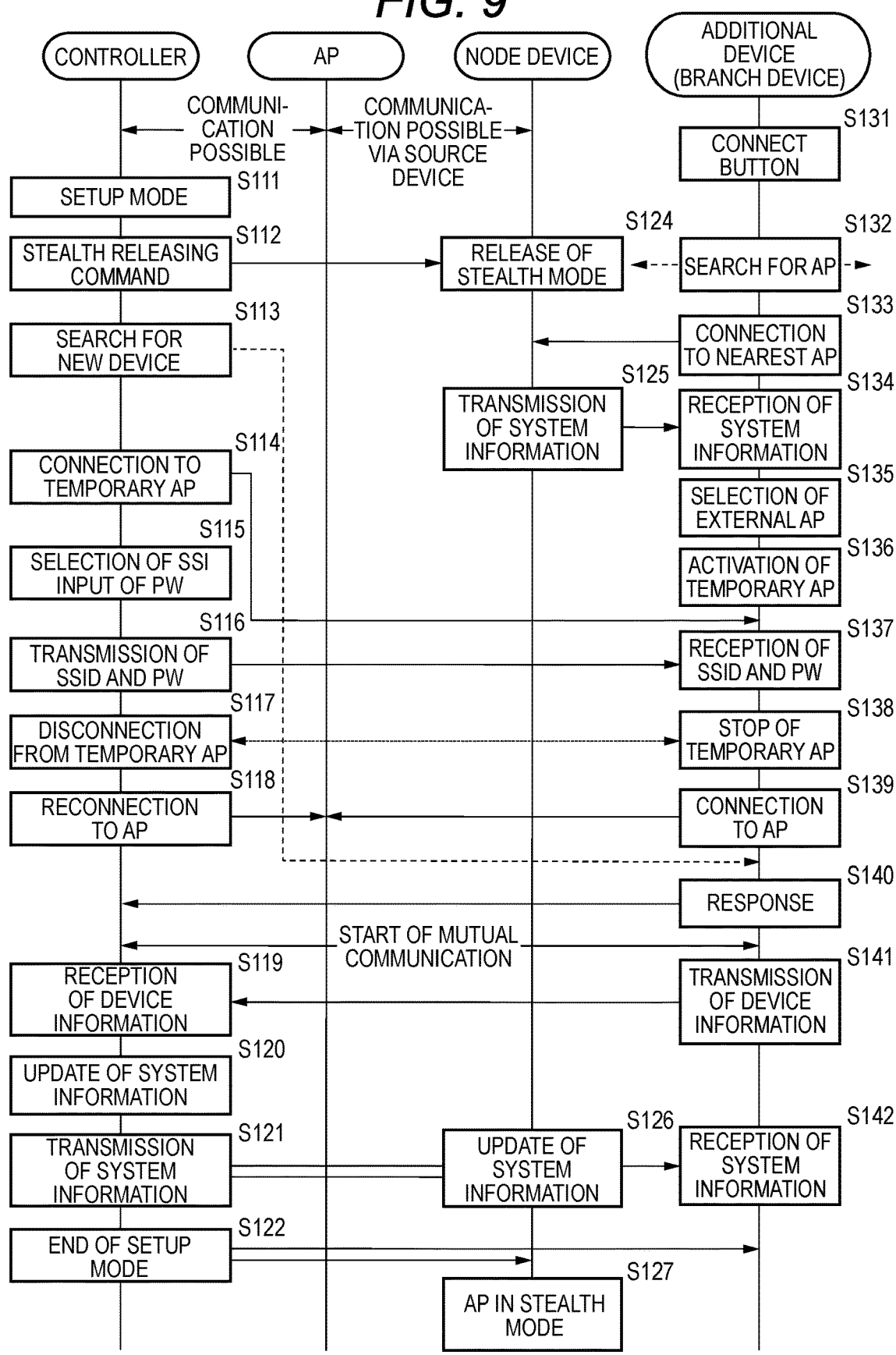
FIG. 9 is a view showing a procedure for communication between the controller and audio devices.

FIG. 9 is a view showing the communication procedure in the case that a branch device is added to the constructed audio system 10. In this example, a case in which the audio device 4-14 is connected to the external access point 3 as a branch device of the audio system 10-1 will be described.

When the mobile phone 1-1 functioning as the controller 1-1 enters a setup mode by user operation (at S111), a guidance screen for urging the user to press the connect button 59A of the audio device 4 is displayed on the display portion 41. The user presses the connect button 59A of the audio device 4-14 according to the guidance of this screen (at S131). The controller 1-1 instructs the audio devices (the root device 4-11, the node devices 4-12 and 4-13) having already being registered in the system management table to release the stealth mode (at S112). Hence, each audio device 4 releases the stealth mode of the internal access point 4A and transmits a beacon notifying its existence, whereby the access point is made accessible from the audio device 4-14 (at S124). Next, the controller 1-1 starts the search for a new device (at S113).

When the connect button 59A of the audio device 4-14 is pressed by the user (at S131), the audio device 4-14 enters an initial connection mode and searches for a connectable access point (at S132). Although the nearest access point is selected, it is herein assumed that the internal access point 4A-13 of the node device 4-13 has been selected. The audio device 4-14 makes connection to the internal access point 4A-13 (the node device 4-13) by using the SSID and the password derived from the MAC address of the internal access point 4A-13 (at S133). After that, the system information of the audio system 10-1 (system ID=01) at the present time is obtained from the node device 4-13 (at S125, S134).

After that, the audio device 4-14 is selected so as to be used as a branch device to be connected to the external access point 3 by user operation or by the judgment of the control portion 50 of the audio device 4-14 that have made reference to the system information (at S135); at this time point, no terminal is wirelessly connected to the access point 3 and the SSID and PW of the access point 3 are not known; for the purpose of obtaining these, the connection to the node device 4-13 is released, and a temporary access point to be used only at the initial connection time is activated in a stand-alone state (at S136). In other words, an access point that is not connected to the wired LAN 2 but connected to only the audio device 4-14 is activated. The controller 1-1 stores the SSID and the password of the temporary access point for initial connection in advance. More specifically, the SSID and the password have been written as data in the audio system control program 70 in advance. Hence, the controller 1-1 finds this temporary access point during the search for a new device started at S83, releases the connection to the external access point 3 once, and then makes connection to the temporary access point activated by the audio device (at S114).

The procedure wherein the controller 1-1 transmits the connection information of the access point 3 to the audio device 4-14 is carried out as described below. The controller 1 achieved by installing an application program in the mobile phone 1-1 has a high possibility that the SSID and the password of the access point 3 cannot be obtained from the system program of the mobile phone 1; hence, the user is herein requested to input the SSID and the password of the access point 3 (at S115). The input of the SSID may be carried out by a method wherein the list of connection destinations (SSIDs) that can be seen at the time is shown on the display and the user is made to select the SSID of the access point 3. The user is made to input the password (usually shown on the main body of the access point 3). After that, the input connection information is transmitted to the audio device 4-14 that is connected as the temporary access point (at S116). The audio device 4-14 then receives this connection information (at S137).

After transmitting the connection information (SSSSID and password) of the access point 3 to the audio device 4-14, the controller 1-1 releases the connection to the access point for initial connection (at S117). In parallel with this process, the audio device 4-14 stops the temporary access point for initial connection after receiving the connection information of the access point 3 from the controller 1-1 (at S138).

The controller 1-1 makes connection again to the external access point 3, the connection to which has been released once (at S118). The audio device 4-14 also makes connection to the external access point 3 by using the obtained connection information (SSID and password) (at S139). The audio device 4-14 receives the search message (transmitted continuously from S113) from the controller 1-1 via the access point 3 and responds to this message (at S140). Hence, the controller 1-1 and the audio device 4-14 start mutual communication via the access point 3.

The audio device 4-14 transmits its own device information to the controller 1-1 (at S141). The controller 1-1 receives this device information (at S119) and additionally registers this audio device 4-14 in the audio system 10-1 (system ID=01) being managed at present, thereby updating the system information (at S120). The updated system information is transmitted to all the audio devices 4 of the audio system 10-1 (at S121), and the setup mode is ended (at S122). The notification of the end of the setup mode is also transmitted to all the audio devices 4.

The audio device 4-14 receives this system information and sets the management table of the audio system 10-1 to which the audio device itself belongs (at S142). Hence, the audio device 4-14 becomes a component of the audio system 10-1, and, for example, a music piece to be reproduced and its volume are controlled by the controller 1-1. Furthermore, the node device 4-13 having received the system information from the controller 1-1 updates the management table stored therein by using this system information (at S126). Then, the mode of the internal access point 4A-13 is returned to the stealth mode (at S127). In parallel with these processes, processes similar to those at S126 and S127 are also carried out in the root device 4-11 and the node device 4-12.

The audio device in this disclosure may be an audio/video (AV) device having a video reproducing function and includes a system in which these functions are mixed. Furthermore, in this embodiment, the control terminal device is achieved by the mobile phone 1 in which the audio system control program 70 (application program) has been installed; however, the control terminal device may have other configurations. For example, the control terminal device may be a tablet in which the audio system control program 70 is installed or may be a dedicated terminal device.

The embodiment according to this disclosure will be summarized as described below.

(1) The communication system according to this disclosure is a communication system including: one or more first communication devices mutually communicating via a network; and a first control terminal that controls the one or more first communication devices via the network, wherein first system identification information indicating that the one or more first communication devices belong to a first communication system is attached to the one or more first communication devices; wherein the one or more first communication devices and the first control terminal have a first system management table including the first system identification information and information on the one or more first communication devices; and wherein the first control terminal transmits a command via the network to the one or more first communication devices to which the first system identification information is attached.

(2) In the communication system set forth in the above-mentioned item (1), for example, the one or more first communication devices transmit an audio signal via the network to the other first communication device to which the first system identification information is attached.

(3) In the communication system set forth in the above-mentioned item (1) or (2), for example, the communication system further includes one or more second communication devices mutually communicating via the network; and a second control terminal that controls the one or more second communication devices via the network, wherein second system identification information indicating that the one or more second communication devices belong to a second communication system is attached to the one or more second communication devices; and wherein the one or more second communication devices and the second control terminal have a second system management table including the second system identification information and information on the one or more second communication devices.

(4) In the communication system set forth in any one of the above-mentioned items (1) to (3), for example, the communication system further includes one or more third communication devices mutually communicating via another network different from the network, wherein third system identification information indicating that the one or more third communication devices belong to a third communication system is attached to the one or more third communication devices; wherein the one or more third communication devices have a third system management table including the third system identification information and the information on the one or more third communication devices; and wherein the first control terminal transmits a command via the other network to the one or more third communication devices to which the third system identification information is attached.

(5) In the communication system set forth in the above-mentioned item (4), for example, the first control terminal has the first system management table and the third system management table; and wherein the first control terminal transmits a command to the one or more first communication devices to which the first system identification information is attached or the one or more third communication devices to which the third system identification information is attached by switching between the first system identification information and the third system identification information.

(6) In the communication system set forth in any one of the above-mentioned items (1) to (5), for example, the first, second and third communication devices are audio devices.

(7) A communication system, wherein the communication system set forth in the above-mentioned item (1) is used as a unit communication system, and wherein a plurality of unit communication systems being identified by mutually different kinds of system identification information is formed on the same network.

(8) A communication system, wherein the communication system set forth in the above-mentioned item (1) is used as a unit communication system, wherein unit communication systems being identified by mutually different kinds of system identification information are respectively formed on a plurality of networks; and wherein when the single first control terminal is connected to each of the plurality of networks, the control terminal transmits the command to the unit communication system being present on the network by using the unit communication system as an object to be controlled.

(9) In the communication system set forth in the above-mentioned item (7) or (8), for example, the unit communication system is a unit audio system.

(10) The control terminal according to this disclosure is a control terminal configured so as to be able to communicate with one or more communication devices mutually communicating via a first network, the control terminal including: a communication portion capable of being connected to the first network; a storage portion configured to store a first system management table including a first system identification information indicating that the one or more first communication devices belong to a first communication system and the information on the one or more first communication devices; and a control portion configured to control the one or more communication devices, wherein the control portion is configured to transmit a command via the first network to the one or more communication devices to which the first system identification information is attached.

(11) In the control terminal set forth in the above-mentioned item (10), for example, the communication portion can communicate with one or more second communication devices mutually communicating with a second network different from the first network; wherein the storage portion configured to store a second system management table including a second system identification information indicating that the one or more second communication devices belong to a second communication system and the information of the one or more second communication devices; wherein the control portion is configured to control the one or more second communication devices; wherein the control portion is configured to select one of the first system management table and the second system management table; and wherein the control portion is configured to transmit a command via the first network to the one or more first communication devices to which the first system identification information is attached when the control portion selects the first system management table, and to transmit a command via the second network to the one or more second communication devices to which the second system identification information is attached when the control portion selects the second system management table.

(12) In the control terminal set forth in the above-mentioned item (10) or (11), for example, the command includes at least one of a command for starting a reproduction of an audio source or a music piece and a command for controlling a volume of the musical sound to be reproduced.

(13) In the control terminal set forth in any one of the above-mentioned items (10) to (12), for example, the communication devices are audio devices.

(14) The method for managing the communication system according to this disclosure is a method for managing a communication system including one or more first communication devices mutually communicating via a first network and a control terminal configured to control the one or more first communication devices via the first network, wherein first system identification information indicating that the one or more first communication devices belong to a first communication system is attached to the one or more first communication devices; wherein the control terminal has a first system management table including the first system identification information and the information on the one or more first communication devices; and wherein the control terminal is configured to transmit a command via the first network to the one or more first communication devices to which the first system identification information is attached.

(15) In the method for managing the communication system set forth in the above-mentioned item (14), for example, wherein the communication system further comprises one or more second communication devices mutually communicating via a second network different from the first network, and the control terminal is configured to control the one or more second communication devices via the second network; wherein second system identification information indicating that the one or more second communication devices belong to a second communication system is attached to the one or more second communication devices; wherein the control terminal further has a second system management table including the second system identification information and the information on the one or more second communication devices; and wherein the control terminal is configured to select one of the first system management table and the second system management table; wherein the control terminal configured to transmit a command via the first network to the one or more first communication devices to which the first system identification information is attached when the control terminal selects the first system management table; and wherein the control terminal is configured to transmit a command via the second network to the one or more second communication devices to which the second system identification information is attached when the control terminal selects the second system management table.

(16) In the method for managing the communication system set forth in the above-mentioned item (14) or (15), for example, the communication devices are audio devices.

With this disclosure, communication devices are connected using a network, and a plurality of communication systems can be constructed on a single network, whereby the disclosure is useful in that a plurality of communication systems on a plurality of networks can be controlled.

What is claimed is:

1. A communication system comprising:
    a plurality of first communication devices configured to be connected to a network and having a first system management table, first system identification information being attached to the plurality of first communication devices, and the first system identification information indicating that the plurality of first communication devices belong to a first communication system, wherein at least one first communication device of the plurality of first communication devices includes an internal access point configured to connect other first communication devices among the plurality of first communication devices to the network via the internal access point; and
    a first control terminal that controls the plurality of first communication devices via the network and transmits a command, via the network to the plurality of first communication devices, to which the first system identification information is attached, the first control terminal having the first system management table, the first system management table including the first system identification information and information about the plurality of first communication devices, wherein the communication system is an audio system, and the plurality of first communication devices are audio devices,
    wherein the at least one first communication device including the internal access point is (a) configured to act as a root device that serves as an internal access point of the network and is (b) configured to directly connect to the network, and other first communication devices of the first plurality of communication devices are configured to connect to the network via the at least one first communication device configured to act as the root device,
    wherein except for the at least one first communication device configured to act as the root device, all first communication devices of the plurality of first communication devices are configured to connect to the network via an access point of the network, and
    wherein the at least one first communication device configured to act as the root device is configured to serve as the internal access point for a maximum of two first communication devices arranged in a lower hierarchy level of the network than the at least one first communication device configured to act as the root device.

2. The communication system according to claim 1, wherein the at least one first communication device configured to act as the root device is configured to transmit an audio signal received via the network to other first communication devices to which the first system identification information is attached.

3. The communication system according to claim 1, further comprising:
    a plurality of second communication devices configured to be connected to the network; and
    a second control terminal that controls the plurality of second communication devices via the network,
    wherein second system identification information indicating that the plurality of second communication devices belong to a second communication system is attached to the plurality of second communication devices; and
    wherein the plurality of second communication devices and the second control terminal have a second system management table including the second system identification information and information about the plurality of second communication devices.

4. The communication system according to claim 1, further comprising:
    a plurality of third communication devices configured to be connected to another network different from the network,
    wherein third system identification information indicating that the plurality of third communication devices belong to a third communication system is attached to the plurality of third communication devices;
    wherein the plurality of third communication devices have a third system management table including the third system identification information and information about the plurality of third communication devices; and
    wherein the first control terminal transmits a command, via the another network to the plurality of third communication devices, to which the third system identification information is attached.

5. The communication system according to claim 4, wherein the first control terminal has the first system management table and the third system management table; and
    wherein the first control terminal transmits a command, to the plurality of first communication devices, to which the first system identification information is attached, or the first control terminal transmits a command, to the plurality of third communication devices, to which the third system identification information is attached by switching between the first system identification information and the third system identification information.

6. The communication system according to claim 4, wherein the plurality of communication devices are audio devices.

7. The communication system according to claim 1, wherein in a case (i) where another first communication device is to be newly connected to the at least one first communication device configured to act as the root device and (ii) where the at least one first communication device configured to act as the root device is not already serving as the internal access point for the maximum of two first communication devices arranged in the lower hierarchy level of the network, the another first communication device is (iii) newly connected to the internal access point of the at least one first communication device configured to act as the root device and (iv) arranged in the lower hierarchy level of the network, and wherein in a case (i) where the another first communication device is to be newly connected to the at least one first communication device configured to act as the root device and (v) where the at least one first communication device configured to act as the root device is already serving as the internal access point for the maximum of two first communication devices arranged in the lower hierarchy level of the network, the another first communication device is (vi) newly connected to the at least one first communication device configured to act as the root device via one of the two first communication devices arranged in the lower hierarchy level of the network and (vii) arranged in a lowest hierarchy level of the network.

8. The communication system according to claim 7, wherein the maximum of two first communication devices, which are arranged in the lower hierarchy level of the network and connected to the internal access point of the at least one first communication device configured to act as the root device, each act as a node device that respectively serve as internal access points of the network in the lower hierarchy level of the network, and wherein in the case (i) where the another first communication device is to be newly connected to the at least one first communication device configured to act as the root device and (v) where the at least one first communication device configured to act as the root device is already serving as the internal access point for the maximum of two first communication devices arranged in the lower hierarchy level of the network, the another first communication device is (vi) newly connected to the at least one first communication device configured to act as the root device via an internal access point of the one of the two first communication devices acting as the node device and (vii) arranged in the lowest hierarchy level of the network.

9. The communication system according to claim 1, wherein the at least one first communication device configured to act as the root device is configured to directly connect to the network by a wired connection, and the other first communication devices of the first plurality of communication devices are configured to wirelessly connect to the internal access point of the at least one first communication device configured to act as the root device.

10. A communication system, wherein the communication system according to claim 1 is used as a unit communication system; and wherein a plurality of unit communication systems being identified by mutually different kinds of system identification information is formed on the same network.

11. The communication system according to claim 10, wherein the unit communication system is a unit audio system.

12. A communication system, wherein the communication system according to claim 1 is used as a unit communication system;

wherein unit communication systems being identified by mutually different kinds of system identification information are respectively formed on a plurality of networks; and wherein when a single first control terminal is connected to each of the plurality of networks, the control terminal transmits the command to the unit communication system being present on the network by using the unit communication system as an object to be controlled.

13. A control terminal configured to be able to communicate with a plurality of first communication devices configured to be connected to a first network, the control terminal comprising:

a communication circuit configured to connect to the first network;

a storage configured to store a first system management table including a first system identification information indicating that the plurality of first communication devices belong to a first communication system and information about the plurality of first communication devices, the information about the plurality of first communication devices indicating that at least one first communication device of the plurality of first communication devices includes an internal access point that is configured to connect other first communication devices among the plurality of first communication devices to the network via the internal access point; and a control circuit configured to control the plurality of first communication devices and to transmit a command, via the first network to the plurality of first communication devices, to which the first system identification information is attached, wherein the first communication system is an audio system, and the plurality of first communication devices are audio devices, wherein the at least one first communication device including the internal access point is (a) configured to act as a root device that serves as an internal access point of the network and is (b) configured to directly connect to the network, and other first communication devices of the first plurality of communication devices are configured to connect to the network via the at least one first communication device configured to act as the root device, wherein except for the at least one first communication device configured to act as the root device, all first communication devices of the plurality of first communication devices are configured to connect to the network via an access point of the network, and wherein the at least one first communication device configured to act as the root device is configured to serve as the internal access point for a maximum of two first communication devices arranged in a lower hierarchy level of the network than the at least one first communication device configured to act as the root device.

14. The control terminal according to claim 13, wherein the communication circuit can communicate with a plurality of second communication devices configured to be connected to a second network different from the first network;
wherein the storage is configured to store a second system management table including a second system identification information indicating that the plurality of second communication devices belong to a second communication system and information about the plurality of second communication devices;
wherein the control circuit is configured to control the plurality of second communication devices;
wherein the control circuit is configured to select one of the first system management table and the second system management table; and
wherein the control circuit is configured to transmit a command, via the first network to the plurality of first communication devices, to which the first system identification information is attached when the control circuit selects the first system management table, and to transmit a command, via the second network to the plurality of second communication devices, to which the second system identification information is attached when the control circuit selects the second system management table.

15. The control terminal according to claim 13, wherein the command includes at least one of a command for starting a reproduction of an audio source or a music piece and a command for controlling a volume of a musical sound to be reproduced.

16. A method for managing a communication system comprising a plurality of first communication devices configured to communicate via a first network and a control terminal configured to control the plurality of first communication devices via the first network, the method comprising:
attaching first system identification information indicating that the plurality of first communication devices belong to a first communication system to the plurality of first communication devices, at least one first communication device of the plurality of first communication devices including an internal access point configured to connect other first communication devices among the plurality of first communication devices to the network via the internal access point;
storing, by the control terminal, a first system management table including the first system identification information and information about the plurality of first communication devices; and
transmitting, by the control terminal, a command, via the first network to the plurality of first communication devices, to which the first system identification information is attached,
wherein the communication system is an audio system, and the plurality of first communication devices are audio devices,
wherein the at least one first communication device including the internal access point is (a) configured to act as a root device that serves as an internal access point of the network and is (b) configured to directly connect to the network, and other first communication devices of the first plurality of communication devices are configured to connect to the network via the at least one first communication device configured to act as the root device,
wherein except for the at least one first communication device configured to act as the root device, all first communication devices of the plurality of first communication devices are configured to connect to the network via an access point of the network, and
wherein the at least one first communication device configured to act as the root device is configured to serve as the internal access point for a maximum of two first communication devices arranged in a lower hierarchy level of the network than the at least one first communication device configured to act as the root device.

17. The method for managing a communication system according to claim 16, wherein the communication system further comprises a plurality of second communication devices configured to be connected to a second network different from the first network, and the control terminal is configured to control the plurality of second communication devices via the second network;
wherein second system identification information indicating that the plurality of second communication devices belong to a second communication system is attached to the plurality of second communication devices;
wherein the control terminal further has a second system management table including the second system identification information and information about the plurality of second communication devices;
wherein the control terminal is configured to select one of the first system management table and the second system management table;
wherein the control terminal transmits a command, via the first network to the plurality of first communication devices, to which the first system identification information is attached when the control terminal selects the first system management table; and
wherein the control terminal transmits a command, via the second network to the plurality of second communication devices, to which the second system identification information is attached when the control terminal selects the second system management table.

* * * * *